Feb. 1, 1966   J. PERTHEN ETAL   3,231,979
ELECTRICAL METHODS AND DEVICES FOR TESTING THE SURFACE
FORMATION AND ERRORS OF SHAPE OF WORKPIECES
Filed July 6, 1959   7 Sheets-Sheet 1

INVENTORS
JOHANNES PERTHEN
HANS-KARL STEUDEL AND
WERNER GERIGHAUSEN
BY Robert E Burns
ATTORNEY

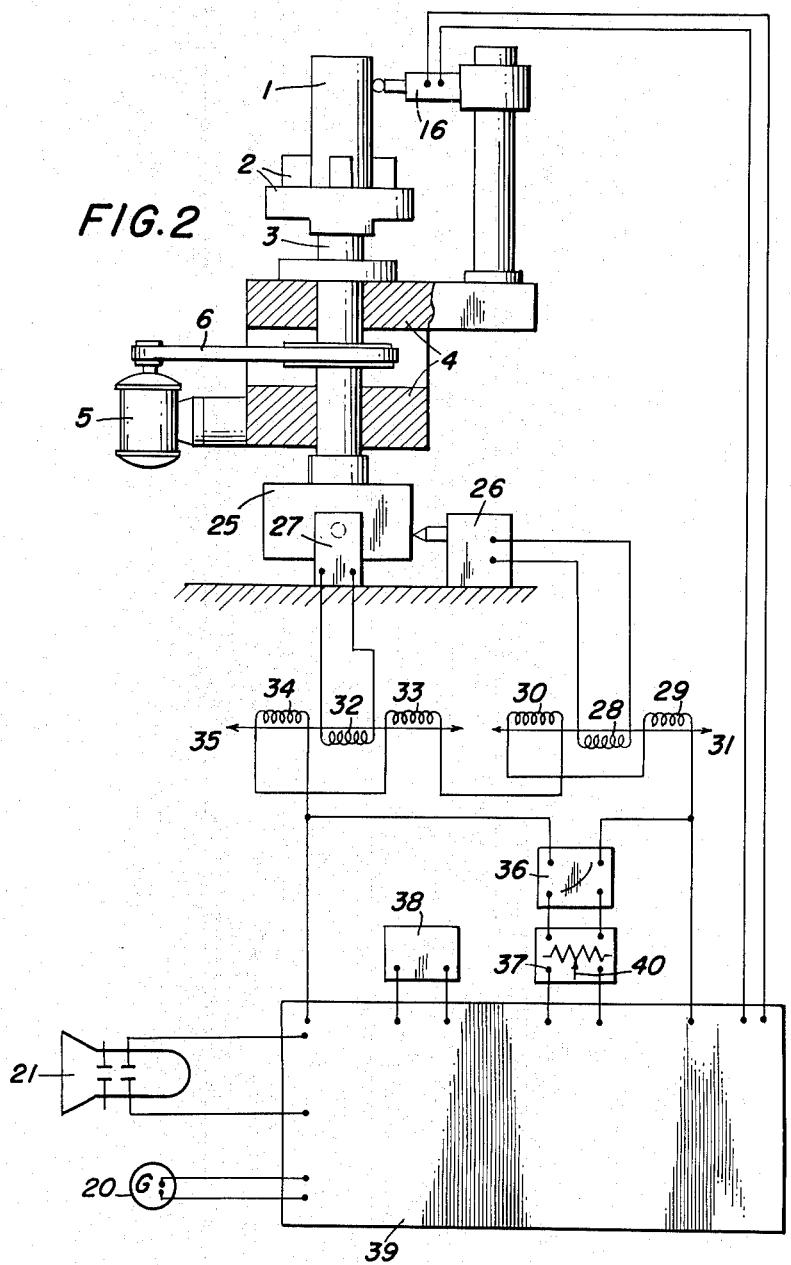

INVENTORS
JOHANNES PERTHEN
HANS-KARL STEUDEL AND
WERNER GERIGHAUSEN

BY Robert E. Burns
ATTORNEY

Feb. 1, 1966 J. PERTHEN ETAL 3,231,979
ELECTRICAL METHODS AND DEVICES FOR TESTING THE SURFACE
FORMATION AND ERRORS OF SHAPE OF WORKPIECES
Filed July 6, 1959 7 Sheets-Sheet 4
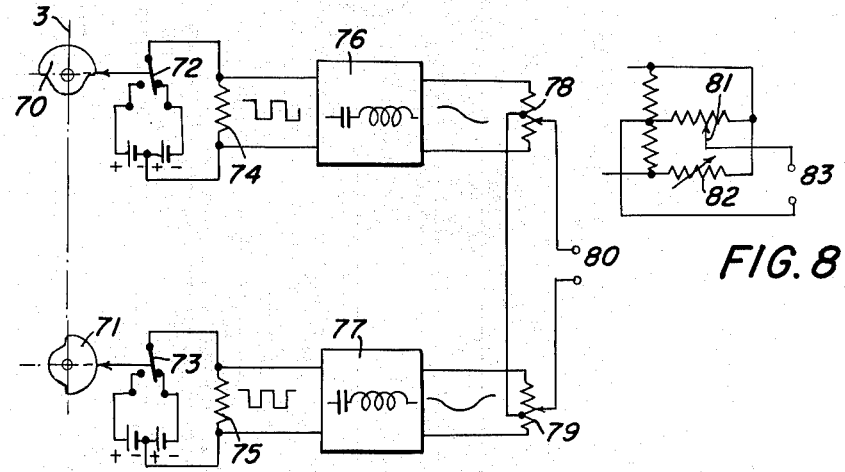
FIG.8
FIG.7
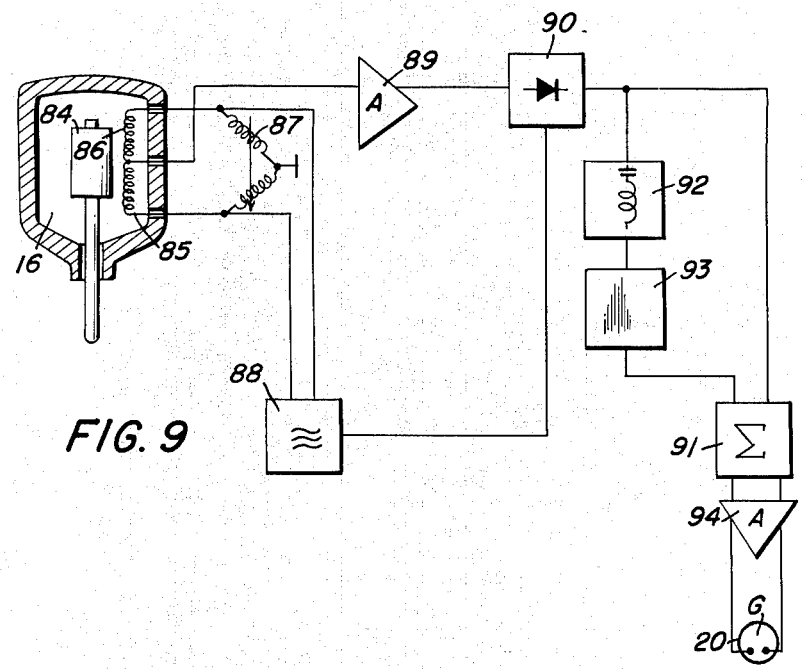
FIG.9
INVENTORS
JOHANNES PERTHEN
HANS-KARL STEUDEL AND
WERNER GERIGHAUSEN
BY Robert E Burns
ATTORNEY

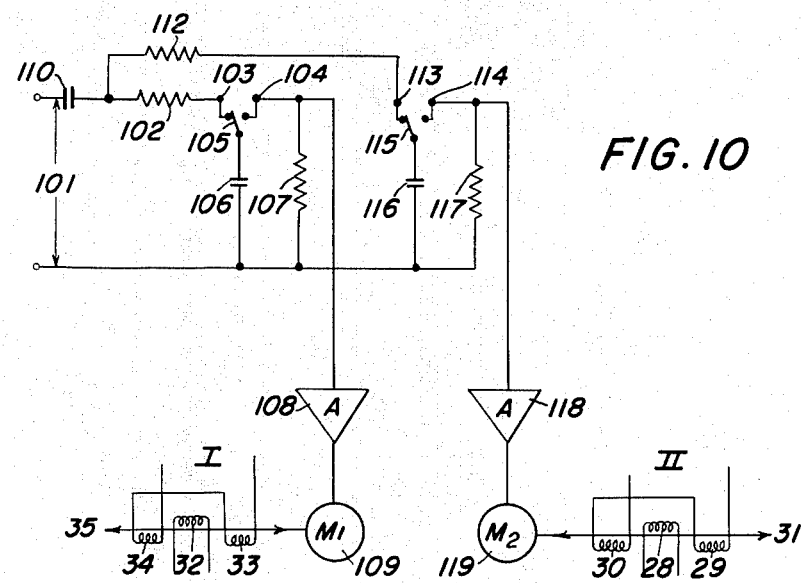
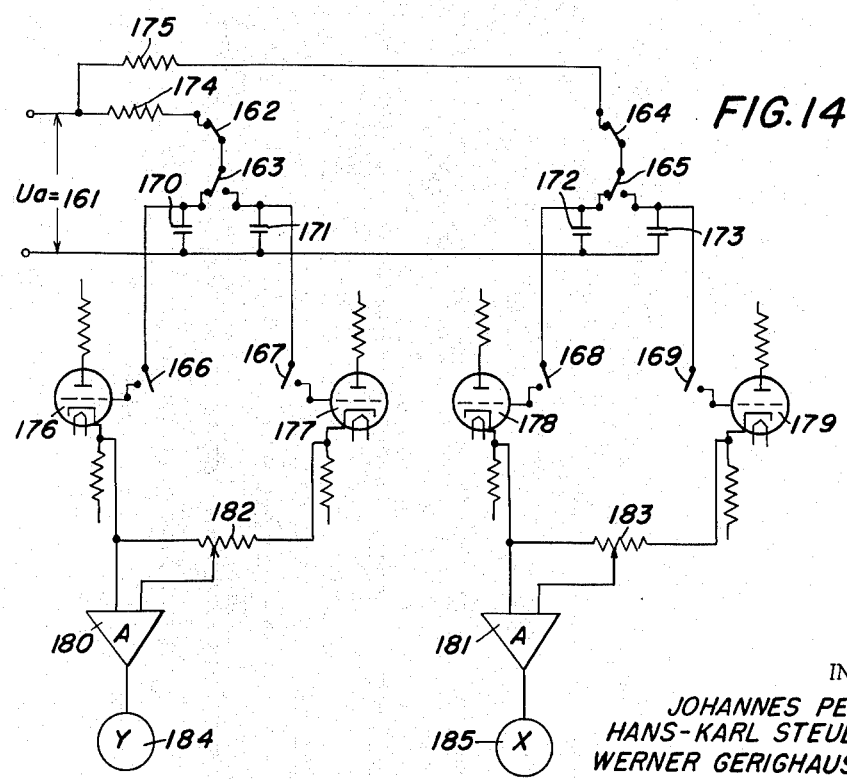

INVENTORS
JOHANNES PERTHEN
HAN-KARL STEUDEL AND
WERNER GERIGHAUSEN
BY Robert E. Burns
ATTORNEY

United States Patent Office 3,231,979
Patented Feb. 1, 1966

3,231,979
ELECTRICAL METHODS AND DEVICES FOR TESTING THE SURFACE FORMATION AND ERRORS OF SHAPE OF WORKPIECES
Johannes Perthen, Sedanstrasse 19, Hannover, Germany, and Hans-Karl Steudel and Werner Gerighausen, Hannover, Germany, assignors to Johannes Perthen, Hannover, Germany
Filed July 6, 1959, Ser. No. 825,227
Claims priority, application Germany, July 11, 1958, P 21,002
17 Claims. (Cl. 33—174)

This invention relates to electrical methods and devices for testing surface deformations and errors of shape of workpieces having a substantially circular cross-section.

The surface deformations and faulty shape of a workpiece is currently tested by exploring it with an accurate and electrically operated linear probe, the readings of which are greatly magnified for recording. The probe moves parallel to the surface to be tested. The problem then arises of so adjusting, in relation to one another, the probe and the workpiece to be measured. The probe and workpiece generally move relatively to one another so that an initial reference condition is established. Moreover, care must be taken that during this mutual relative movement they do not move substantially away from the datum condition established. The probe and the workpiece may, for example, execute a rotary movement in relation to one another, preferably about a center point or axis. Their mutual relative movement must then take place as if they had a common center for their relative movement. It is therefore a question of adjusting the two in relation to one another, during the basic setting, in such a manner that this common center is obtained with the closest possible approximation. This operation is hereinafter called "centering."

If a longitudinal displacement is effected between the probe and the workpiece, then any direction of the axis of the workpiece which differs from the direction of movement of the probe, otherwise than as a result of the faulty shape of the workpiece may likewise lead to the probe becoming disengaged from the workpiece. The axis of the workpiece and the movement of the probe must therefore be brought parallel to one another, this operation being hereinafter called "alinement."

The centering and alinement must be so accurate that the errors in the centering and alinement are less than the errors in the surface and shape formation. The requirements as regards the accuracy of the centering and alinement are therefore high. Hitherto, this centering and alinement have been carried out by hand, with purely mechanical means; either the test piece or the measuring instrument or both was or were displaced relatively to one another by means of finely adjustable spindles, until the smallest possible centering and alinement errors were obtained. This procedure takes a great deal of time and it requires high mechanical precision in the setting means used and great experience on the part of the operator.

The necessary mechanical centering and alinement means, with which adjustments of 0.001 mm. may have to be made, cause instability in the mechanical testing device. This does not come to rest but continues to vibrate so that the set measurement varies and becomes unreliable and inaccurate. This results not only from the resilience of the mechanical components but also from the friction in the guides, which is variable and may yield under the relative movements of workpiece and probe, fluctuating measuring forces, external shocks and temperature variations, causing uncontrollable variations which extend over long periods.

The invention has for its main object to overcome these disadvantages by means of electrical centering and alinement, without any adjusting movements having to be carried out at the mechanical testing device, or by means of automatic electrical control of mechanical setting means.

According to the invention, the workpiece to be tested, which has first been roughly centered and alined mechanically on a testing device, is explored with an electrical precision probe, the feeler member of which can be adjusted in linear proportion over a wide range, and the electrical values which correspond to the centering and alinement errors are subtracted, by electrical means, from the electrical values thus obtained. The electrical precision probe with which the workpiece to be tested is explored, actually supplies an indicator reading M which contains both the surface and shape error F and the centering and alinement error Z; thus $M = F + Z$. Now in order to obtain the surface and shape error alone, there is connected to the test device a second electro-mechanical device which is constructed in such a manner that it supplies an electrical correction factor B which is proportional only to the centering and alinement error Z; thus $B = Z$. If the correction factor B is subtracted by electrical means from the measurement M then:

$$M - B = (F + Z) - Z = F$$

Thus all that remains is the required surface and shape error F. This can then be further magnified and then indicated without any mechanical fine centering or fine alinement having to be effected between the workpiece to be tested and the electrical probe. As a result, the mechanical testing device becomes very simple and stable. In addition, the finding and subtraction of the correction factor B can be carried out automatically so that the electrical centering and alinement can be carried out very quickly and without any particular skill on the part of the operator.

If a roughly centered workpiece of circular cross-section is explored by a measuring probe $Tm$, then the following indicator reading M is obtained:

$$M = F + K \cdot e \cdot \sin (\omega t + \varphi) - \frac{K \cdot e^2}{d + D} \cdot \cos (\omega t + \varphi)$$

wherein:
$F$ = the surface and shape error;
$K$ = a proportionality factor;
$e$ = the magnitude of the eccentricity or of the alinement error of the workpiece;
$\varphi$ = the position of the eccentricity or of the alinement error;
$D$ = the detected diameter of the workpiece;
$d$ = the diameter of the feeler tip of the probe;
$\omega$ = the relative angular speed of the workpiece and probe;
$t$ = time.

The correction factor B thus consists of a linear term $(K \cdot e \cdot \sin (\omega t + \varphi))$ and a square term $$\left( \frac{K \cdot e^2}{d + D} \cdot \cos^2 (\omega t + \varphi) \right)$$

which will be discussed in more detail below. The above-mentioned second electro-mechanical device associated with the testing device therefore has to produce an electrical correction factor B which is adjustable with respect to the above-mentioned determinants $e$; $\varphi$; $D$ and $d$ and contains the necessary linear and square term of the above equation.

Specific objects of the invention are to provide a number of solutions of this problem, as explained hereinafter with reference to FIGURES 1 to 14 of the accompanying drawings, which represent diagrammatically devices for testing workpieces by the improved method.

FIG. 2, is a diagram illustrating a master body rotatable with a rotatable spindle and two stationary pick-ups exploring the master body in order to generate voltages delivered to correcting elements;

FIG. 7, is a diagram illustrating a simplification of the sine-wave alternators illustrated in FIGS. 3 to 6;

FIG. 8, is a diagram illustrating schematically a regulator for sinusoidal voltages derived from ordinary alternating current generators synchronized with a spindle bearing the workpiece;

FIG. 9, is a schematic illustrating schematically a two-way circuit dividing the voltage generated by pick-up means for testing the workpiece in two branch lines;

FIG. 10, is a schematic illustrating schematically the elimination of errors in shape from the formation of the factors depending only on the eccentricity;

FIG. 14, is a diagram illustrative of an arrangement according to the invention in order to align electrically the workpiece in testing.

Figure 1:
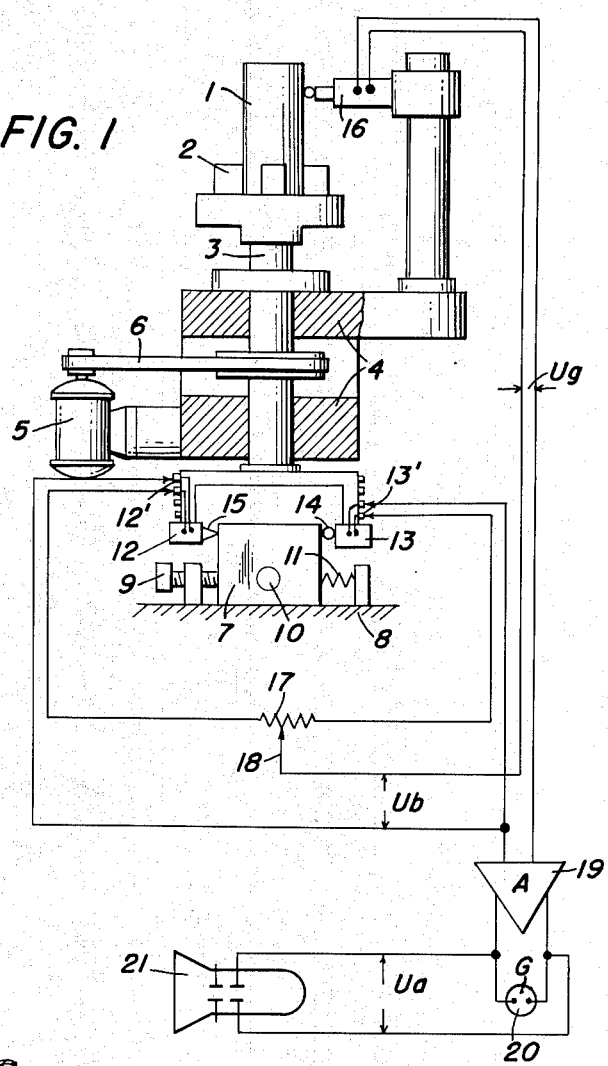
FIG. 1, is a schematic diagram of an embodiment of the invention illustrating a testing assembly in which a rotatable spindle bears the workpiece and the pick-up producing the electrical values M corresponding to the surface profile and errors of shape F as well as the centering and alinement errors Z.

(1) One or more correcting probes Tb move relatively to a mechanical cylindrical master or gage, the position of which is adjustable and which has no surface or shape errors, at the same speed as the measuring probe Tm and the workpiece. The sensitivity of the correcting probe Tb is at least 10 times less than that of the measuring probe Tm so that the master has to be adjusted by amounts at least 10 times greater than the workpiece to be tested in order to produce the electrical correcting value B which is to be subtracted from the value M (FIGURE 1).

(2) Two or more correcting probes Tb which are off-set at an angle in relation to one another, move relatively to a mechanical body or gage which is not adjustable but which has a fixed alinement or centering error, but no surface or shape error, at the same relative speed that the measuring probe Tm and the workpiece move relatively to one another. As a result, a plurality of correcting factors (for example two, $B_1$ and $B_2$) are obtained, which are fed into a calculating circuit and there mixed in a suitable manner so that the correction factor B or the above-mentioned equivalent is obtained as the result (FIGURE 2).

(3) Instead of the correcting probe Tb and a mechanical body or gage contacted thereby, electro-mechanical measurement transducers, of capacitative, inductive, ohmic or other type, are used and rotated at the same relative speed as the measuring probe Tm and the workpiece. These transducers supply sinusoidal voltages from which the correction factor B is again formed in accordance with the above formula by means of a suitable calculating circuit (FIGURES 3 to 6).

(4) The electro-mechanical measurement transducers associated with the relatively moving member involve a heavy expense. This is reduced if, instead, trip cams are installed which, by means of simple switches, produce square-wave voltages offset by 90°. From these, by means of suitable filters, sinusoidal voltages are produced which can then be converted into correction factors by means of the same calculating device as has already been mentioned under head (3).

(5) Alternatively, sine-wave generators, for example of known type equipped with electronic valves, may be used to produce the sinusoidal voltages, if they are tuned in frequency, to the relative speed between the workpiece and the measuring probe and are suitably controlled thereby (FIGURE 8).

(6) Finally, it is possible to filter out the indicated voltage M, which is supplied by the measuring probe Tm and which contains both the required surface and shape error and the eccentricity and alinement error, using suitable filters. As shown in FIG. 9, the voltage generated by the pick-up testing is divided in two branch lines, the one branch line is connected in series through electric wave filters with the electrical measuring device, the other branch line is connected directly with said electrical measuring device in such a way that the correcting values delivered from said filters is subtracted from the values produced by said pick-up; only the surface and shape errors are left over (FIGURE 9).

Figure 11:
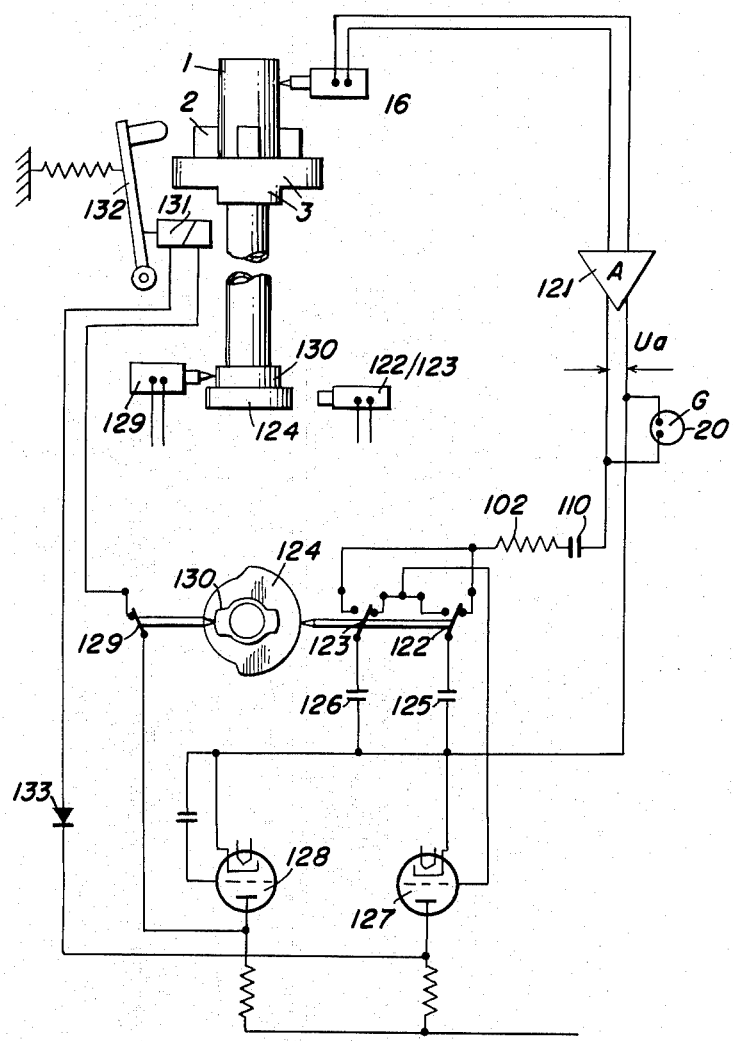
FIG. 11, is a schematic illustrating schematically the automatic centering by mechanical fine centering or adjustment of the workpiece and measuring probe in relation to one another.

(7) An advantage of all the electrical correction methods mentioned consists in that they can easily be adapted to fully automatic correction of the measurement. An example of this is shown in FIGURE 10. On the other hand, with the improved method of the present invention it is possible to carry out not only a purely electrical but also an electro-mechanical correction wherein the position of the workpiece and the measuring probe in relation to one another is adjusted (FIGURE 11).

(8) FIGURE 14 shows an example of the use of the improved devices of the invention for removing the alinement error when there is relative longitudinal movement between the workpiece and the measuring probe (exploring the generatrix or circumference).

(9) An oscillograph tube may be employed to check the correction and to display the result of the measurement. A suitable deflecting circuit for this is illustrated by way of example in FIGURE 13.

In FIGURE 1, a cylindrical workpiece 1 is gripped by a four-jaw chuck 2 mounted on a vertical spindle 3 which is rotatably mounted in bearings 4 and is driven by a motor 5 by means of a belt 6. Below the spindle 3 is disposed a disc or body 7 which has been very accurately machined and has a highly accurate cylindrical shape. This disc forms a master resting on a plane surface 8 upon which it can be displaced in two perpendicular coordinates, by means of two adjusting screws 9 and 10. A spring 11 acts against the adjusting screw 9; a like spring acting against the adjusting screw 10 which cannot be seen in FIGURE 1.

Mounted on the lower end of spindle 3 are two electrical correcting probes 12 and 13, which are connected through slip rings 12' and 13' respectively to an adjustable resistance regulator 17 mounted externally. The probe 12 comprises a knife-edge feeler 15 and the probe 13 a ball feeler 14, with which they touch the displaceable body 7. It is essential that the two probes 12 and 13 should either be situated one above the other on the same side of the body 7, in which case they should have the same polarity, or that they be situated diametrically opposite to one another, as illustrated in FIGURE 1, in which case they should have opposite polarity, and explore the body 7 at points offset by 180° in relation to one another.

The correcting probe 13 with its ball feeler 14 provides a voltage signal representative of a correction factor which corresponds to the equation given above and which therefore contains both the linear and the square terms. The correcting probe 12, on the other hand, which explores the body 7 with a knife-edge feeler 15, produces a voltage signal representative of a correction factor without a square term because in it $d=\infty$. The correction voltages supplied by the two probes 12 and 13 are applied to a common adjustable regulator 17, at which the resulting correcting voltage $U_b$ can be taken off. According as circumstances may require it the slider 18 of the regulator is set more towards the component voltage with the square term or to the one without the square term, the dependence of the square term on the external diameter of the workpiece 7 can be adjusted.

As explained in column 2 in the formula (lines 39 and 40) and in lines 54 to 57 a square term is necessary in order to eliminate completely the centering error. The linear correction term is delivered from the pick-up having a linear testing edge and the square term is delivered from the pick-up having a special testing surface.

The arrangement of these two correcting probes 12 and 13, with their different shapes of feelers 14 and 15, is particularly necessary with large eccentricities and small diameters of the workpiece, because in such cases the square term cannot be ignored. The voltages delivered from the correction pick-ups is adjusted by the potentiometer 17, 18 (FIG. 1) or by the differential transformer 31 to 35 (FIG. 2). It is however possible to use only one correcting probe, preferably with a straight knife-edge feeler 15, if the requirements as regarding correction of the eccentricity are not particularly high, the total magnification is low and the diameters of the workpieces are large.

The correction voltage $U_b$ is connected in opposition to an indicated voltage $U_g$ received from a measuring probe 16 sensing the workpiece 1. As a result, the indicated voltage $U_a$ is obtained which, after amplification by means of an amplifier 19, can be shown on an instrument 20 or on an oscillograph tube 21. The body or master 7 is now displaced by means of the adjusting screws 9 and 10, in such a manner that the factor $e$ and the eccentricity $\varphi$ of the workpiece 1 position are corrected, as can easily be carried out by observing the deflection of the pointer on the instrument 20. That is to say compensation of eccentricity takes place by moving the master so that the indicator 20 is at zero on the various quadrants in that readings in between will be those of actual defects. Furthermore, allowance can be made for the diameter of the workpiece 1 by adjustment of the regulator 17, 18.

The general arrangement illustrated in FIGURE 1 is illustrated in an improved and simplified device shown in detail in FIGURE 2. A disc 25 which has been very accurately machined to cylindrical shape, is secured to the spindle 3 in such a manner that it always rotates with a specific eccentricity, which cannot be further varied mechanically. This disc 25 is explored by two electric correcting probes 26 and 27 which touch it tangentially with knife-edges. The measuring probes 26 and 27 are arranged at an angle of 90° in relation to one another.

By means of these two correcting probes 26 and 27, sinusoidal electrical voltages are produced, which have the same frequency as the total measurement voltage picked up by the measuring probe 16. In order to be able to correct this total measuring voltage, not only the magnitude or amplitude but also the phase or position of the eccentricity must be variable continuously from 0° to 360°. This can be achieved by the sinusoidal voltages produced by the correcting probes 26 and 27, because these two voltages are phase-displaced by 90° in relation to one another and because the square terms described above are eliminated by exploring the disc 25 with knife-edges.

Let it be assumed that the probe 26 supplies a voltage $A_0 \cdot \sin \omega t$, and the probe 27 a voltage $B_0 \sin (\omega t + 90°)$. These two voltages are now each supplied to a differential transformer with windings 28, 29, 30 and 32, 33, 34, which are additively connected together. As a result of the addition of two sinusoidal voltages of the same frequency, a resulting sinusoidal voltage of the same frequency is obtained of the magnitude, as already known in the electrical engineering.

$R = A \cdot \sin \omega t + B \cdot \sin (\omega t + 90°) = E \cdot \sin (\omega t + x)$ in which $E = \sqrt{A^2 + B^2}$ and $x = \arc tgA/B$. Now if it is possible to regulate the amplitudes of the voltages which the probes 26 and 27 have supplied, in an infinitely variable manner, by means of two circuit elements, then it is possible to adjust every resulting amplitude or every magnitude of the eccentricity and every phase angle $x$ between 0° and 360°, that is any desired position of the eccentricity.

These circuit elements or regulating means are the displaceable ferromagnetic cores 31 and 35 of two transformers, because these cores vary the coupling between the transformer windings, as a result of which the amplitude of the sinusoidal voltages naturally varies also. Thus, merely by a displacement of these cores 31 and 35, it is possible to adjust the first linear term of the correction factor according to the formula given above. Essentially the squaring circuit consists of a diode, the quadratic part of the characteristic of which is developed as shown by means 53 in FIG. 13. Naturally, the differential transformers indicated are only an example of a solution which would also be possible by other means.

For perfect or complete correction, the square term of the formula must now also be obtained. For this purpose, the output voltage appearing at the differential transformers is supplied not only to the amplifier 39 but also as a component voltage to a squaring circuit 36. Any known circuit may be used as a squaring circuit, for example a square rectifier, an electronic tube with an output having a square characteristic or a Hall generator. A voltage which corresponds to the factor $$k_3 \cdot E^2 \cdot \sin^2 (\omega t + x)$$

is then obtained at the output of the squaring circuit 36.

This voltage is now applied to the voltage divider potentiometer 37 which serves the purpose of dividing it by the factor $k_3 \cdot k_1 \cdot (D_1 + d_1)$. Since the diameter $D_1$ of the workpiece to be tested and the diameter $d_1$ of the feeler ball are known magnitudes, the effect of the workpiece diameter can be set merely by adjusting the regulating slider 40 or by tapping off a component voltage of the voltage squared in the squaring circuit 36. For complete correction, it is now still necessary to introduce an electrical factor which is proportional to the term $$(k_1 \cdot \epsilon^2)/(D_1 + d_1)$$

The voltage supplied by a direct-current source for example, a battery 38 will serve for this purpose.

The aforesaid voltages are applied to an amplifier 39 and added in the amplifier 39, that is to say the total measuring voltage which is supplied by the measuring probe 16, the voltages proportional to the linear correction term from the differential transformers or the correction probes 26 and 27—which voltages are of opposite signs—and the voltages forming the square correction term from the squaring circuit 36 with the voltage divider 37 and the voltage originating from the direct-current voltage source 38.

Electrical centering is effected by setting the regulating slider 40 to the diameter of the workpiece and by adjusting the transformer couplings 31 and 35 until a concentric circle is described on the screen of an oscillograph 21. Finally, the direct-current source 38 is regulated to such a voltage that the pointer of the instrument 20 stands at zero or, in the case of workpieces having errors of shape, oscillates about the zero point.

Instead of regulating the direct-current source 38, it is also possible to adjust a regulating member which varies the balance of the input circuit in the measuring probe 16.

In the devices shown in FIGURES 1 and 2, it is particularly important that the electrical correcting probes 12, 13 and 26, 27 should have a considerably lower sensitivity than the total measuring probe 16. For example, if their sensitivity amounts to one-tenth of the sensitivity of the probe 16, then the eccentricity of the disc 7 or 25 must be ten times greater than that of the workpiece 1 if the voltage supplied by the correcting probes 12, 13 or 26, 27 is to have the same magnitude as the voltage of the measuring probe 16. As a result of these measures, however, minor inaccuracies and surface errors in the disc 7 or 25 only affect the electrical correction factor with about one-tenth of their true mechanical magnitude.

Figure 3:
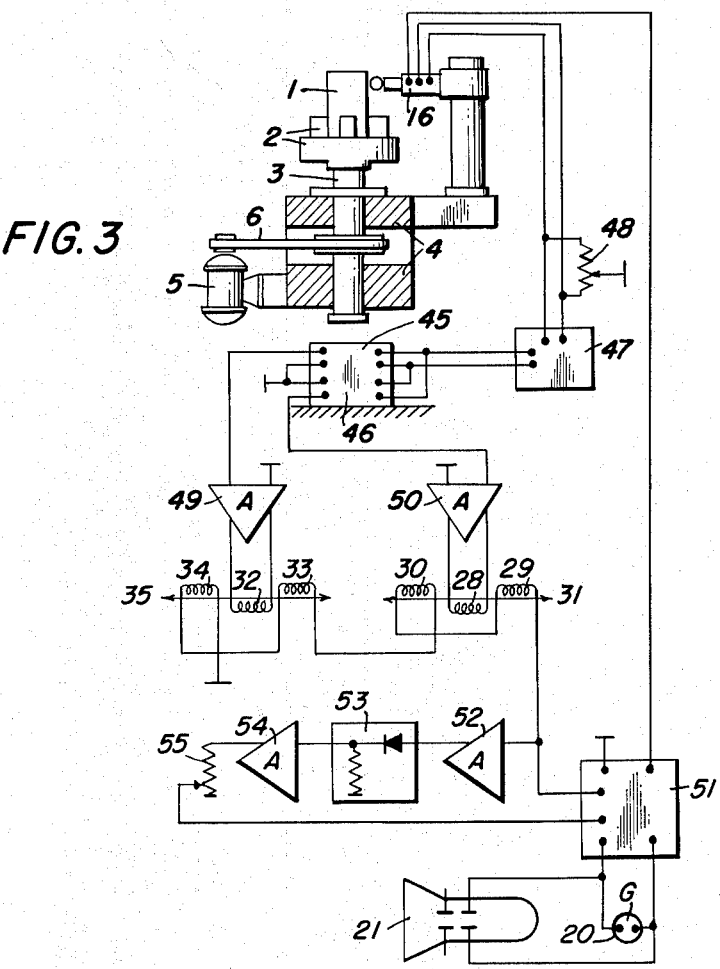
FIG. 3, is a diagram illustrating the use of two rotors generating sinusoidal voltages for the correcting device in order to avoid use of a master and pick-ups sensing the master.

The device illustrated in FIGURE 3 avoids the exploration of the eccentric disc with correcting probes. For this purpose, the spindle 3 is connected to two rotors 45 and 46 which, on one revolution of the spindle 3, transmit two sinusoidal voltages which are offset by 90° in relation to one another. The feed of these rotors and of the probe 16 is effected by means of an oscillator 47 with an alternating-current voltage of higher frequency, a so-called carrier frequency, the amplitude of which is modulated, that is to say its voltage is varied, by means of the rotors 45 and 46, according to a sine function, and by the measuring probe 16 in proportion to the total measurement. If necessary, the rotors 45 and 46 may act through amplifiers 49 and 50 on two regulators, for example the differential transformers 28, 29, 30, 31 and 32, 33, 34, 35, from which one component voltage is supplied directly and a second component voltage is supplied indirectly through amplifier 52, squaring member 53, amplifier 54 and the regulator 55 necessary for the diameter setting, to an integrating stage 51. Zeroising is effected by means of a regulator 48 connected in the input circuit of the measuring probe 16, and centering is effected as described with reference to FIGURE 2.

Figure 4:
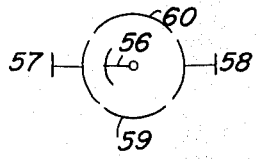
FIGS. 4, 5 and 6, are illustrative respectively of a capacitive, inductive and a resistance rotor for generating sinusoidal voltages and being equivalent to the rotors shown in FIG. 3.
Figure 5:
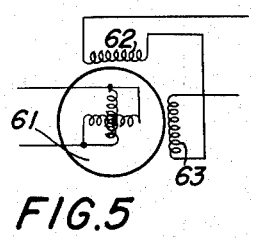
Figure 6:
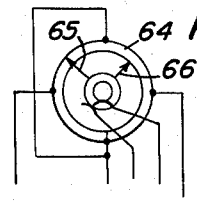

The rotor 45 for producing the sinusoidal voltages may be of capacitative type as shown in FIGURE 4, in which case, for example, the capacitor electrode 56 connected to the spindle 3 rotates in front of suitably constructed fixed electrodes 57, 58, 59, 60, of which 57 and 58 are at zero potential while 59 and 60 are connected to the oscillator 47. FIGURE 5 shows an inductive rotor with windings 61 rotating in relation to fixed windings 62 and 63 which are offset by 90°. FIGURE 6 shows a resistance rotor with an annular resistance 64 tapped at four points and two brush springs 65 and 66 for taking off the sinusoidal voltages. Naturally, these rotors 45 and 46 are suitably constructed or corrected so that the voltage supplied thereby is, in fact, sinusoidal.

In FIGURE 7, two cams 70 and 71, offset by 90°, are connected to the spindle 3 for actuating switches 72 and 73 in such a manner that the voltage drop at the resistors 74 and 75 is rectangular. All harmonic components are filtered out by means of band-pass filters 76 and 77. Pure sinusoidal voltages are obtained which are displaced by 90° in relation to one another and which are supplied to the ohmic regulators 78 and 79, by the adjustment of which eccentricity can be simulated in magnitude and position. The total voltage is then corrected by means of the voltage obtained at the output 80, as in FIGURES 1 to 3.

With a spindle 3 rotating at very high speed, the sinusoidal voltages or currents necessary for the correction can be derived from ordinary alternating-current generators which are synchronised with the spindle 3. A regulator of the type shown in FIGURE 8 is then connected to their output, at the regulators 81 and 82 of which the eccentricity is again adjusted according to magnitude and position, and at the output 83 of which the required correction factor can be taken off.

The correction factor can also be filtered out of the total measurement supplied by the measuring probe 16, as shown in FIGURE 9 and explained above. The electromechanical transducer included in the measuring probe 16, for example an inductive transducer 84, 85, 86, is fed by an oscillator 88. The adjusting member 87, which, with the windings 85 and 86, forms a measuring bridge, serves for zeroising. After amplification is an amplifier 89 and phase-sensitive rectification in a demodulator 90, the total voltage is obtained, from which one component voltage is supplied to the adding or subtracting stage 91 and a second component voltage is supplied to the band-pass filter 92. Here the sinusoidal fundamental wave is filtered out by a sharply tuned filter and supplied to the phase-reverter stage 93. At the output of this stage 93, a voltage opposite to the fundamental wave of the total voltage then appears and these can be subtracted from one another in the stage 91. At the output of this stage 91, an indicated voltage proportional to the required error of shape is obtained and can be displayed or read off, through an amplifier 92, by means of an instrument, such as a recorder or oscillograph in the same manner as in FIGURES 1 to 3.

A particular advantage of the electrical centering consists in the fact that it can be carried out automatically regardless of the skill of the operator. FIGURE 10 shows an example of an embodiment which can be attached to one of the measuring circuits described above or a similar one. At its input terminals 101, there appears the indicated voltage $U_a$ which fluctuates according to the eccentricity present, because the correcting voltage is not yet properly adjusted. After separation of the direct-current voltage component by a capacitor 110, the indicated voltage $U_a$ charges a capacitor 106, according to its magnitude, through a resistor 102 and a switch 103, 104, 105. The switch blade 105 is controlled in such a manner that the capacitor is charged during one revolution of the spindle 3 between 0° and 180°. The switch 103, 104, 105 may be operated by the spindle 3 by means of cams not shown. It may also be composed of slip rings, control contacts or electronic switches without contacts. After the spindle 3 has turned through 180°, the contact blade 105 is operated by a cam, not shown, so that it rests on the fixed contact 104. As a result, the discharge voltage of the capacitor 106 is supplied to an amplifier 108 which now supplies a corresponding control to a motor 109 connected to its output. As a result, the motor 109 can adjust the differential transformer 32, 33, 34, 35 by means of which the correcting voltage is regulated as explained in detail above. The capacitor 106 is also discharged, however, through the resistor 107 so that the voltage appearing at the amplifier 108 again drops, and the motor 109 again comes to a stop after a time which depends on the value of the resistor 107. In this manner, the adjustment of the correcting member 32, 33, 34, 35 is dependent not only on the magnitude of the correction to be carried out but also on the position of the eccentricity in relation to the X-axis.

The adjustment of the correcting voltage for the Y-axis is effected in the same manner through corresponding members—resistor 112, switch 113, 114, 115, charging capacitor 116, amplifier 118, setting motor 119, correction member 28, 29, 30, 31 and discharge resistor 117. Here, the charging capacitor 116 is charged during a revolution of the spindle 3 between 90° and 270°, and at 270° the switch blade 115 is thrown to the adjusting circuit 114, 117, 118, 119, 28, 29, 30, 31.

The adjusting factor for producing the correcting voltage as shown in FIGURE 10 depends, according to the invention, only on the eccentricity of the workpiece but not on errors of shape which are superimposed on the eccentricity. By allowing the spindle 3 to rotate repeatedly and connecting in more sensitive measuring ranges, the correction of the eccentricity can be further improved, the resistors 107 and 117 preferably being reduced in size as the changeover to greater sensitivity takes place. As a result, the setting travel of the motors 109 and 119 is reduced according to the reduction in value of the eccentricity still to be corrected.

The elimination of errors in shape from the formation of the setting factors depending only on the eccentricity, as shown in FIGURE 10, can also be carried out in other ways. For example, the capacitor 110 may be dispensed with if, instead of the individual capacitors 106 and 107, two capacitors are charged, through diodes, and their charging voltages are subtracted from one another. The resulting differential voltage is then dependent on the eccentricity but not on the errors of shape.

The automatic centering described above can also be used when the correction of eccentricity is not effected by purely electrical means by producing a correcting voltage, but when it is carried out by mechanical fine centering or adjustment of the workpiece and measuring probe in relation to one another. Such an arrangement is shown by way of example in FIGURE 11.

The workpiece 1 to be tested is fixed on a face-plate which is connected to the rotary spindle 3 and is held by clamping jaws 2. These jaws may be connected to the spindle or face-plate by means of springs or magnets in such a manner that although they can be displaced by heavy forces they hold the workpiece 1 securely with respect to the slight measuring force of the probe 16.

The probe 16 explores the workpiece 1 and picks up the eccentricity, including the shape, which appears at the output of an amplifier 121 as an indicated voltage $U_a$ and can be read off on the instrument 20.

The error voltage dependent on the eccentricity charges capacitors 125 and 126 through the capacitor 110 and resistor 162; the allocation of the charge to the X and Y coordinates of the jaws 2 is effected through switches 122 and 123, which are actuated by a cam 124 connected to the spindle 3. If one of the capacitors 125 or 126 is charged to a positive voltage value, then after the spindle 3 has turned through 180°, as soon as the cam 130 closes the switch 129, a magnet 131 is energized through a valve circuit 127, 128 and applies a slight blow to the jaws 2 through a hammer 132. As a result, the workpiece 1 is displaced radially by a small amount. A rectifier 133 prevents any blow on the jaws from having an adverse effect if the capacitors 125 and 126 are negatively charged. Provision is further made for the capacitors to be discharged after the blow has been delivered so that they can now adjust themselves to the new eccentricity which has been set. A complete arrangement of switches and capacitors similar to 122, 123, 125, 126, 127, 128, 129, 131, 132 and 133 is again present, but offset through 90°, for the adjustment of the Y-axis, but is not shown in FIGURE 11.

Instead of centering the workpiece 1 by means of slight blows, the force of which is proportional to the charge of the capacitor 122 or 123 or to the eccentricity of the workpiece, adjustment and centering can also be carried out by means of motor-driven spindles or the like. The construction shown in FIGURE 11 is purely by way of example because other means may be used to achieve the purpose described. Above all, other electric storage and integrating means may be used instead of capacitors to be charged.

FIGURES 1 to 3 illustrate a cathode-ray oscillograph 21 to indicate the eccentricity and the error in shape. The beam of this oscillograph is deflected either electrostatically by means of two pairs of deflecting plates at right angles to one another, or magnetically by means of two coils, likewise at right angles to one another. In order that a circle may be described, the electron beam must rotate according to the relative speed between the workpiece and the measuring probe, and at the same time be deflected in the radial direction according to the magnitude of the eccentricity and the error in shape.

With magnetic deflection, it is possible, according to the invention, for the indicated voltage $U_a$ or a corresponding current to be supplied to a winding or to two windings in push-pull connection, which are rotated mechanically about the neck of the oscillograph tube at the same relative speed as exists between workpiece and measuring probe.

Figure 12:
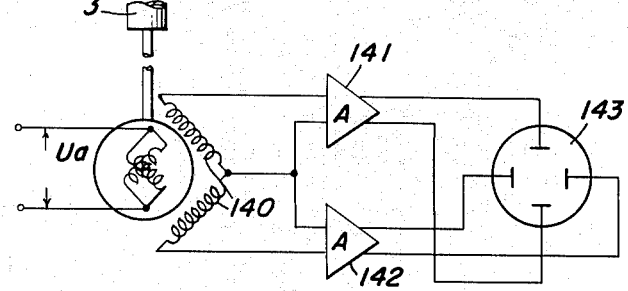
FIG. 12, is a schematic illustrating schematically the supply of correction voltages to a deflector system of an oscillograph tube, the voltages being electrically displaced by 90° in relation to one another.

If the electron beam is deflected statically by deflection plates or mechanically by stationary windings, then the indicated voltage $U_a$ may be supplied, as shown in FIGURE 12, to a rotary converter 140 which rotates at the speed of the workpiece in relation to the measuring probe, for example by coupling to the spindle 3. It supplies two alternating-current voltages which are electrically displaced by 90° in relation to one another and the voltage of which is proportional to the indicated voltage $U_a$. These voltages are amplified in the amplifiers 141 and 142 and supplied to the deflector system of the oscillograph tube 143. The converter may be of the capacitative type as shown in FIGURE 4, of the inductive type as shown in FIGURE 5 or of the ohmic type shown in FIGURE 6. The oscillograph 143 preferably comprises a screen with a long persistence.

Since a transmitter similar to the converter 140 is already installed to produce the correcting voltage which electrically suppresses the eccentricity, the rotor transmitting the correcting voltage can be simultaneously used, according to the invention, as a converter for producing the circular deflection of the cathode ray.

Figure 13:
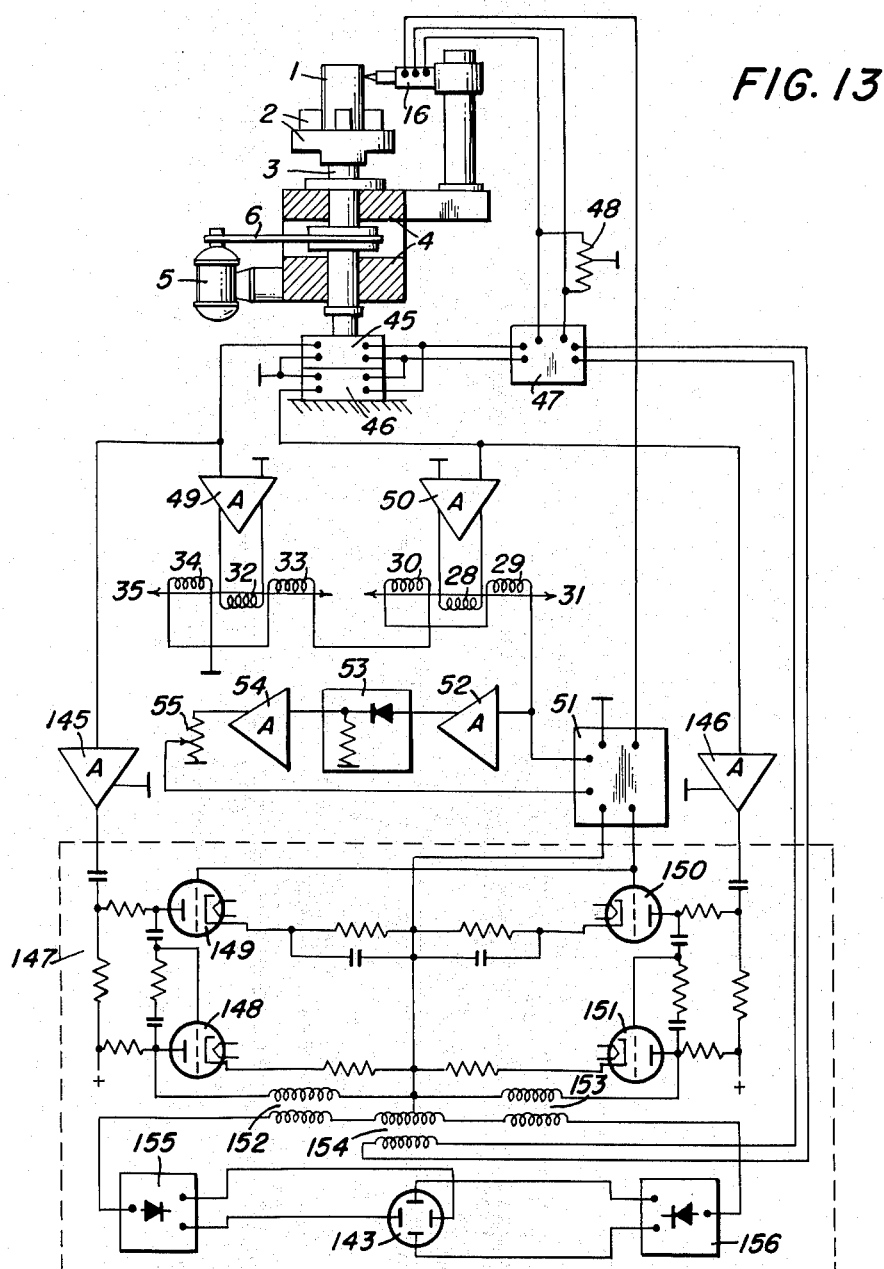
FIG. 13, is a schematic illustrating the full-connections of the apparatus according to the invention, the measuring device of which is an oscillograph tube.

FIGURE 13 illustrates, as an example of the arrangement, a device according to FIGURE 3, in which the rotors or transmitters 45 and 46 connected to the spindle 3 deliver the indicated voltage $U_a$ through the amplifiers 49 and 50, the regulators 28 to 35 and the correction members 52 to 55, together with the total voltage delivered by the measuring probe 16 at the outlet from the integrating stage 51. The indicated voltage $U_a$ is now passed into switching stage 147 on the grid side of two tubes 149 and 150, which are modulated on the anode side by the transmitters 49 and 50, preferably through amplifiers 145 and 146. Through the oppositely close-coupled tubes 148 and 151, and the inductive coupling means 152 and 153, and after demodulation by introduction of the carrier voltage by means of the inductive coupling means 154 and the rectifier 156, the indication is shown on the oscillograph 143.

In like manner as with the centering by electrical method, which has been assumed to be substantially automatic, the workpiece to be tested and the measuring probe can also be alined to one another in the testing of the workpiece generatrix. FIGURE 14 shows one such possible arrangement according to the invention. The switching arrangement here shown is connected to a testing device like that of FIGURES 1, 2 or 3, the indicated voltage of which is represented by the input voltage $U_a=161$ in FIGURE 14. The measuring probe 16 is first located at a point on the workpiece from which the testing of the generatrix is to start. According to the invention, this point is marked so that in a rotation of the workpiece and measuring probe in relation to one another a switch is always operated at this point. For this purpose, either the switch operating means can be made rotatable with the rotating spindle, or the workpiece can be rotatable with switch operating means rigidly connected with the spindle. This switch operating means, corresponding to relative rotary movement between the workpiece and the probe within a defined range of rotary movement, comprises the switches 162 to 165, which within two revolutions effect a discharge of the condensers 170 and 173 through the resistances 174 and 175, and thereby the integration of the input voltage 161. Obviously also other integrating and feeding elements can be employed.

If 0° is the above mentioned initial voltage start point of the generatrix testing, to which workpiece and switching means are adjusted, then the switch 174 switches from 0° to 360° and the switch 164 from 90° to 450°. Within these switching periods, the switch 164 operates between 0° and 180° on the condenser 170 and between 180° and 360° on the condenser 171. Correspondingly the switch 165 works between 90° and 270° on the condensed 172 and from 270° to 450° on the condenser 173.

The difference of the voltages on the condensers 170 and 171 gives a measure for the correction of the device in the Y-direction and the difference of voltage at the condensers 172 and 173 in the X-direction.

The correction at the generatrix now takes place so that the measuring probe moves to the initial position of the generatrix testing range and is there centered in the manner described above. In the position fixed by the switch operating means, the measuring probe now moves to the other end of the generatrix testing range, after reaching which two relative revolutions of the workpiece and measuring probe are performed and the condensers 170 to 173 are discharged. By operation of the switches 166 to 169 the difference value is formed in the cathode circuit of the tubes 176 to 179, so that beyond the amplifiers 180 and 181 the correcting means 184 and 185 for the Y- and X-axes are operated. Since the testing of the generatrix takes place preferably with constant testing speed, the correction of the result in proportion to the testing range can be effected by adjustment of the regulators 182 and 183. As described above in relation to the centering, the correcting means can adjust the measuring probe mechanically in the X- and Y-axes or provide the information only by electrical correcting voltages. It may further be noted that the switches 162 to 169 may be not only electro-mechanical contact switches, but also contactless electronic switches.

The devices described afford above all a special advantage due to the fact that they can be attached to devices already provided for the production of the relative movements, for example directly in machine tools on which the workpieces are manufactured. Hitherto, in spite of centering and correction errors, but because of the impossibility of introducing fine-centering into the highly stressed and complicated machine tools, it has not been possible to ascertain the errors of a workpiece directly upon the machine on which it is made. This is now rendered possible, and the manufacturer is placed in a position to control the machine tools with the devices described above so that the workpieces produced will have no manufacturing errors.

What we claim is:

1. Apparatus for testing surface deviations and errors of shape of a workpiece having a substantially circular cross-section, in combination, means for quickly positioning said workpiece thereon and roughly aligning it with respect to a given reference datum, electrical pick-up means having sensing means for sensing the surface of said workpiece and means for producing an electrical signal having a value representative of the surface profile of the workpiece being sensed, representative of deviation errors of shape of said workpiece and representative of the extent of mechanical misalignment of said workpiece with respect to said given reference datum, means for effecting relative movement between the workpiece and said sensing means, correcting means connected to said pick-up means comprising means for generating a correction signal having a value proportional to the extent of mechanical misalignment of said workpiece with respect to said reference datum and means for subtracting said correction signal from the first-mentioned signal to obtain a corrected signal representative only of said surface profile and errors of shape of said workpiece, and means connected to receive the corrected signal, measure it and indicate it visually.

2. Apparatus for testing surface deviations and errors of shape of a workpiece having a substantially circular cross-section, in combination, means for quickly positioning said workpiece thereon and roughly aligning it with respect to a given reference datum, electrical pick-up means having sensing means for sensing the surface of said workpiece and means for producing an electrical signal having a value representative of the surface profile of the workpiece being sensed, representative of deviation errors of shape of said workpiece and representative of the extent of mechanical misalignment of said workpiece with respect to said given reference datum, means for effecting relative movement between the workpiece and said sensing means, correcting means connected to said pick-up means comprising, means for generating a correction signal having an amplitude proportional to the extent that said workpiece is displaced from alignment with said reference datum, means for subtracting said correction signal from the first-mentioned signal to obtain a corrected signal representative only of said surface profile and errors of shape of said workpiece, and means comprising an oscillograph connected to receive the corrected signal, measure it and indicate it visually.

3. Apparatus for testing surface deviations and errors of shape of a workpiece having a substantially circular cross-section, in combination, means for quickly positioning said workpiece thereon and roughly aligning it with respect to a given reference datum, electrical pick-up means having sensing means for sensing the surface of said workpiece and means for producing an electrical signal having a value representative of the surface profile of the workpiece being sensed, representative of deviation errors of shape of said workpiece and representative of the extent of mechanical misalignment of said workpiece with respect to said given reference datum, means for effecting relative movement between the workpiece and said sensing means, correcting means connected to said pick-up means comprising, means for generating sinusoidal electrical signals having a frequency equal to the frequency of the first-mentioned signal, means connected to said generating means for adding said sinusoidal signals to obtain a resultant correction signal having an amplitude proportional to the extent that said workpiece is displaced from alignment with said reference datum, means for subtracting said correction signal from the first-mentioned signal to obtain a corrected signal representative only of said surface profile and errors of shape of said workpiece, and means connected to receive the corrected signal, measure it and indicate it visually.

4. Apparatus according to claim 3, in which said apparatus further comprises a master of said workpiece free of deviation errors, and said means for generating said sinusodial signals comprises means having relative movement with respect to said master at substantially the same speed of relative movement between said sensing means and said workpiece.

5. Apparatus according to claim 4, further including means to adjustably position said master along two perpendicular coordinates.

6. Apparatus for testing surface deviations and errors of shape of a workpiece having a substantially circular cross-section, in combination, means for quickly positioning said workpiece thereon and roughly aligning it with respect to a given reference datum, electrical pick-up means having sensing means for sensing the surface of said workpiece and means for producing an electrical signal having a value representative of the surface profile of the workpiece being sensed, representative of deviation errors of shape of said workpiece and representative of the extent of mechanical misalignment of said workpiece with respect to said given reference datum, means for effecting relative movement between the workpiece and said sensing means, correcting means connected to said pickup means for generating a correction signal having a value proportional to the extent of mechanical misalignment of said workpiece with respect to said reference datum, comprising, means comprising other sensing means for sensing a deviation free master of said workpiece and generating two sinusoidal electrical signals having a frequency equal to the frequency of the first-mentioned signal, means connected to said generating means for adding said sinusoidal signals to obtain said correction signal having an amplitude proportional to the extent that said workpiece is displaced from alignment with said reference datum, means for subtracting said correction signal from the first-mentioned signal to obtain a corrected signal representative only of said surface profile and errors of shape of said workpiece, and means connected to said correcting means to receive the corrected signal, measure it and indicate it visually.

7. Apparatus according to claim 6, in which said other sensing means comprises a pair of displaceable opposite polarity sensing probes disposed angularly spaced 180° apart, one of said pair of probes having an arcuate contact surface for sensing the master and the other of said pair of probes having a knife-edge contact for sensing the master.

8. Apparatus according to claim 6, in which said other sensing means comprises, a pair of sensing means angularly spaced 90° for sensing the master tangentially, said adding means comprising two transformers having displaceable cores and windings connected for adding the signals to obtain said correction signal.

9. Apparatus according to claim 8, in which said means for generating said correction signal comprises electrically adjustable emitters adjustably controlled by relative movement of said sensing means and said workpiece.

10. Apparatus according to claim 9 in which said emitters comprise capacitative emitters.

11. Apparatus according to claim 9, in which said emitters comprise inductive emitters.

12. Apparatus according to claim 9, in which said emitters comprise ohmic emitters.

13. Apparatus for testing surface deviations and errors of shape of a workpiece having a substantially circular cross-section, in combination, means for quickly positioning said workpiece thereon and roughly aligning it with respect to a given reference datum, electrical pick-up means having sensing means for sensing the surface of said workpiece and means for producing an electrical signal having a value representative of the surface profile of the workpiece being sensed, representative of the extent of mechanical misalignment of said workpiece with respect to said given reference datum, means for effecting relative movement between the workpiece and said sensing means, correcting means connected to said pickup means for generating a correction signal having a value proportional to the extent of mechanical misalignment of said workpiece with respect to said reference datum comprising, means comprising two electrical emitters for generating two sinusodial electrical signals 90° out of phase with one another and having a frequency equal to the frequency of the first-mentioned signal, means connected to said generating means for adding said sinusoidal signals to obtain said correction signal having an amplitude proportional to the extent that said workpiece is displaced from alignment with said reference datum, means for subtracting said correction signal from the first-mentioned signal to obtain a corrected signal representative only of said surface profile and errors of shape of said workpiece, and means connected to receive the corrected signal, measure it and indicate it visually.

14. Apparatus for testing surface deviations and errors of shape of a workpiece having a substantially circular cross-section, in combination, means for quickly positioning said workpiece thereon and roughly aligning it with respect to a given reference datum, electrical pick-up means having sensing means for sensing the surface of said workpiece and means for producing an electrical signal having a value representative of the surface profile of the workpiece being sensed, representative of deviation errors of shape of said workpiece and representative of the extent of misalignment of said workpiece with respect to said given reference datum, means for effecting relative movement between the workpiece and said sensing means, correcting means connected to said pick-up means for generating a correction signal having a value proportional to the extent of mechanical misalignment of said workpiece with respect to said reference datum comprising, means comprising a circuit having switch means operable by said means for effecting relative movement at a frequency for generating sinusoidal electrical signals having a frequency equal to the frequency of the first-mentioned signal and including frequency for filtering said signals, means connected to said generating means for adding said sinusoidal signals to obtain said resultant correction signal having an amplitude proportional to the extent that said workpiece is displaced from alignment with said reference datum, means for subtracting said correction signal from the first-mentioned signal to obtain a corrected signal representative only of said surface profile and errors of shape of said workpiece, and means connected to receive the corrected signal, measure it and indicate it visually.

15. In testing apparatus, drive means for rotating a circular part, pickup means positioned adjacent said part and adapted to produce an electrical output representative of radial displacement thereof, signal generating means synchronized with said drive means and adapted to produce an alternating signal of variable phase and amplitude, and combining means connected to receive said electrical output and said alternating signal and adapted to produce a composite output wherein only the effect of said part being off-center is cancelled.

16. In roundness measuring apparatus, drive means for rotating a circular part, a pickup positioned to bear upon the periphery of said part and adapted to produce an electrical output corresponding to radial displacement, a circular cam adapted to rotate in synchronization with said drive means, a pair of displacement pickups, positioned to bear upon the periphery of said cam at positions spaced arcuately by 90° and adapted to produce a pair of alternating signals, means for varying the amplitudes and for reversing the phase of said pair of alternating signals, means connected to all of said pickups and adapted to combine all of said signals to provide a composite output wherein the effect of said part being off-center is cancelled, and indicating means connected to receive said composite output.

17. In apparatus for measuring roundness of a circular part, drive means for rotating said part, a first displacement pickup positioned to bear upon the periphery of said part and adapted to produce a first signal, a circular cam connected to said drive means to rotate in synchronization with said part, second and third displacement pickups positioned to bear upon the periphery of said cam at points arcuately spaced by 90° and adapted to produce second and third signals, first and second control means for varying the amplitude and phase of each of said second and third signals respectively, first combining means connected to said first and second pickups and adapted to produce a first composite output representing the sum of said first and second signals, first switching means connected to said drive means to be reversed in polarity at 180° intervals, means connected to receive said first composite output through said first switching means and adapted to activate said first control means in response to the average value thereof, second combining means connected to said first and third pickups and adapted to produce a second composite output representing the sum of said first and third signals, second switching means connected to said drive means to be reversed in polarity at 180° intervals which are displaced by 90° with respect to said first switching means, and means connected to receive said second composite output through said second switching means and adapted to activate said second control means in response to the average value thereof.

(References on following page)

References Cited by the Examiner

UNITED STATES PATENTS

| | | | |
|---|---|---|---|
| 2,240,278 | 4/1941 | Abbott | 33—172 |
| 2,457,727 | 12/1948 | Rifenbergh | 33—179 |
| 2,583,253 | 1/1952 | Carder | 33—174 |
| 2,601,447 | 6/1952 | Neff | 33—174 |
| 2,640,274 | 6/1953 | Crosby | 33—172 |
| 2,854,757 | 10/1958 | Roeger | 33—172 |
| 2,913,829 | 11/1959 | Arlin | 33—172 |

ISAAC LISANN, *Primary Examiner.*

LOUIS R. PRINCE, *Examiner.*